(12) United States Patent
Gigli et al.

(10) Patent No.: US 12,171,242 B2
(45) Date of Patent: Dec. 24, 2024

(54) METHOD AND PLANT FOR THE STORAGE OF SAUSAGES

(71) Applicant: PULSAR INDUSTRY S.R.L., Spilamberto (IT)

(72) Inventors: Emanuele Gigli, Spilamberto (IT); Lorenzo Grandi, Spilamberto (IT); Massimo Venturi, Spilamberto (IT)

(73) Assignee: Pulsar Industry S.R.L., Spilamberto (IT)

( * ) Notice: Subject to any disclaimer, the term of this patent is extended or adjusted under 35 U.S.C. 154(b) by 50 days.

(21) Appl. No.: 17/941,204

(22) Filed: Sep. 9, 2022

(65) Prior Publication Data

US 2023/0116035 A1 Apr. 13, 2023

(30) Foreign Application Priority Data

Sep. 10, 2021 (IT) .................. 102021000023414

(51) Int. Cl.
*A22C 15/00* (2006.01)

(52) U.S. Cl.
CPC .......... *A22C 15/002* (2013.01); *A22C 15/001* (2013.01); *A22C 15/007* (2013.01)

(58) Field of Classification Search
CPC ....... A22B 7/002; A22C 15/00; A22C 15/001; A22C 15/002; A22C 15/007
USPC .................................. 452/51, 182, 183, 186
See application file for complete search history.

(56) References Cited

U.S. PATENT DOCUMENTS

| | | | | |
|---|---|---|---|---|
| 5,238,353 A * | 8/1993 | Kollross | ............... | A22C 15/007 198/803.14 |
| 7,255,638 B2 * | 8/2007 | Stimpfl | ................ | A22C 15/001 452/32 |
| 7,563,158 B2 * | 7/2009 | Haschke | ................ | B65G 65/00 452/141 |
| 7,588,485 B1 * | 9/2009 | Nakamura | ........... | A22C 15/001 452/51 |
| 7,614,942 B2 * | 11/2009 | Liermann | ............ | A22C 15/007 452/186 |
| 9,131,706 B2 * | 9/2015 | Kessler | .................. | A22C 15/00 |

FOREIGN PATENT DOCUMENTS

| | | |
|---|---|---|
| DE | 20 2013 103 618 U1 | 12/2014 |
| EP | 2 870 880 A1 | 5/2015 |
| EP | 3 072 396 A1 | 9/2016 |
| EP | 3 090 971 A1 | 11/2016 |

\* cited by examiner

*Primary Examiner* — David J Parsley
(74) *Attorney, Agent, or Firm* — Ruggiero McAllister & McMahon LLC

(57) ABSTRACT

In a method and a plant for the storage of sausages, two rows of sausages are simultaneously transferred from a loading station to a support cross member of a vertical store by a pick-and-place device. The pick-and-place device has two support arms that are parallel to one another, have an elongated shape, have respective pluralities of holding members, and are movable relative to one another between a closed position and an open position. The sum of the holding members of the two support arms is equal to the number of hooking members of the support cross member of the store.

15 Claims, 4 Drawing Sheets

METHOD AND PLANT FOR THE STORAGE OF SAUSAGES

CROSS-REFERENCE TO RELATED APPLICATIONS

This patent application claims priority from Italian patent application no. 102021000023414 filed on Sep. 10, 2021, the entire disclosure of which is incorporated herein by reference.

TECHNICAL FIELD

This invention relates to a plant for the storage of sausages.

BACKGROUND

In particular, this invention relates to a plant for the storage of sausages of the type comprising a loading station for the storage of a succession of sausages; a vertical store, which extends in a first direction, and has multiple storage levels overlapping each other in the first direction; and a transfer unit for transferring the sausages from the loading station to the vertical store.

The vertical store has a plurality of vertical uprights parallel to each other and to the first direction.

Each storage level comprises, normally, a pair of first horizontal cross members that are parallel to each other, each of which extends in a second direction that is transverse to the first direction, and is fixed, in particular welded, to a pair of vertical uprights; and a plurality of second horizontal cross members that are parallel to each other and to a third direction that is orthogonal to the above-mentioned first and second directions.

Each second cross member extends between two first cross members, is hooked so that it can be released to the first cross members, and is provided with a plurality of hooking members designed to receive and hold a corresponding sausage each.

Generally, the sausages are transferred to the loading station via a chain conveyor, which extends through a sausage processing station, and is provided with a plurality of second hooking members designed to receive and hold a corresponding sausage each.

The transfer unit comprises, normally, an anthropomorphic robot provided with a pick-and-place device, which is moved by the anthropomorphic robot between a first operating position, wherein the pick-and-place device retrieves the sausages from the loading station, and a second operating position, wherein the pick-and-place device releases the sausages into the vertical store.

The pick-and-place device is configured to retrieve a second cross member from the corresponding storage level, move the second cross member into the loading station, hook a row of sausages, equal in number to half the number of first hooking members, to the second cross member, transfer the second cross member to the vertical store, and hook the second cross member to the corresponding first cross members again.

Once the second cross member in the vertical store is released, the pick-and-place device is, first of all, moved into its first operating position to retrieve a second row of sausages, equal in number to half the number of first hooking members of the second cross member, from the loading station, and is, finally, moved into its second operating position to release the second row of sausages on the second cross member.

With regard to the above, it is appropriate to specify that the two rows of sausages are hooked to opposite sides of the second cross member so as to avoid the sausages of the two rows of sausages coming into contact with each other, thus compromising the correct curing of the sausages.

The known plants for the storage of sausages of the type described above have some drawbacks mainly deriving from the fact that filling each second cross member entails two operating cycles of the pick-and-place device and the transfer of the second cross members between the vertical store and the loading station.

As a result, the productivity of the transfer unit is relatively low, the pick-and-place device is relatively complex and costly, and the vertical store has relatively large dimensions.

SUMMARY

The object of this invention is to provide a plant for the storage of sausages that is free of the drawbacks described above and is simple and economical to implement. According to this invention, a plant for the storage of sausages is provided.

This invention also relates to a method for the storage of sausages.

According to this invention, a method for the storage of sausages is provided as claimed in claims 11 to 15.

BRIEF DESCRIPTION OF THE DRAWINGS

This invention will now be described with reference to attached drawings that illustrate a non-limiting the embodiment thereof, in which.

DESCRIPTION OF PREFERRED EMBODIMENTS

Figure 1:
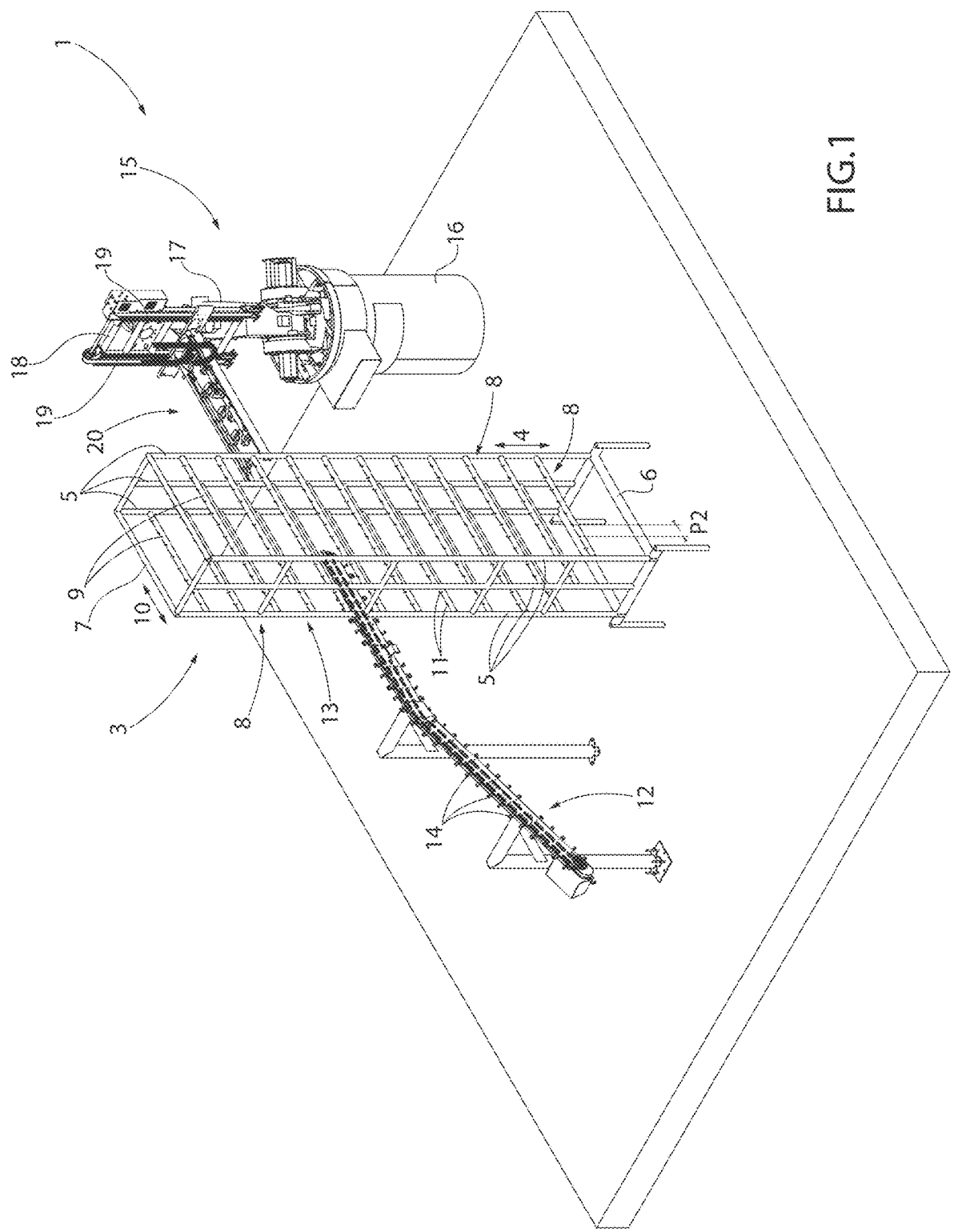
FIGS. 1 and 2 are two schematic perspective views, with parts removed for clarity, of a preferred embodiment of the plant of this invention.
Figure 2:
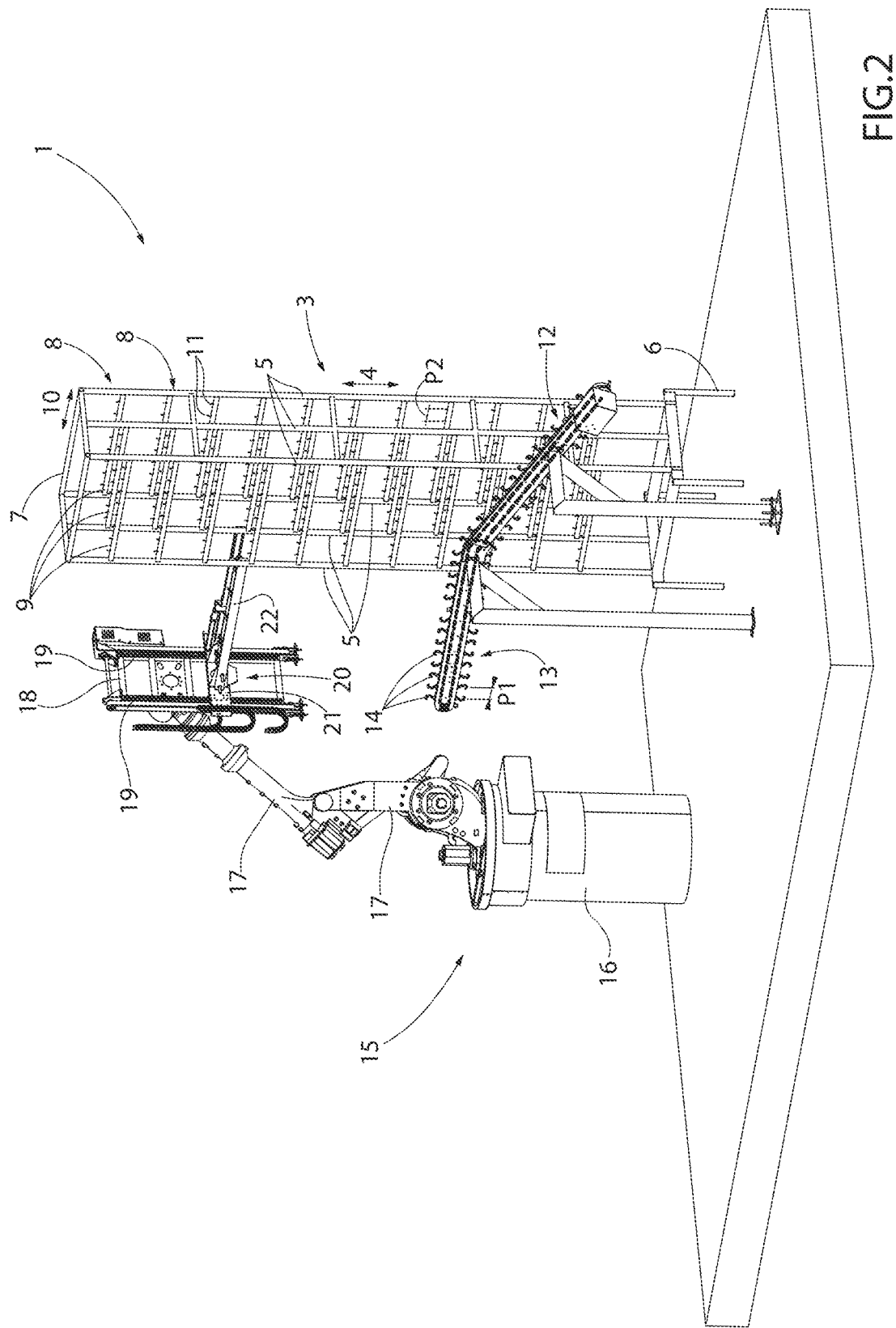

With reference to FIGS. 1 and 2, reference number 1 indicates, as a whole, a plant for the storage of sausages, in this case hams 2.

The plant 1 comprises a vertical store 3, which extends in a direction 4, has a parallelepiped-like shape with a rectangular base, and is provided with a plurality of vertical uprights 5, in this case six vertical uprights 5, which are parallel to each other and to the direction 4.

The uprights 5 are connected to each other, at their lower ends, by a frame 6 resting on the ground, and are connected, in addition, at their upper ends, by a rectangular frame 7.

The uprights 5 can be divided into two groups of three uprights 5, each of which is coplanar to the two uprights 5 of its group of uprights 5 and to an upright 5 of the other group of uprights 5.

The store 3 has a plurality of storage levels 8, which overlap each other in the direction 4, and are defined, in this case, by three horizontal cross members 9 that are coplanar to each other and parallel to a direction 10 that is transverse to the direction 4.

Each cross member 9 is fixed, in particular welded, at its free ends, to two uprights 5, and is provided with multiple hooking pins 11, in this case eight pins 11, which are uniformly distributed along the cross member 9 in the direction 10, and project upwards from the cross member 9.

The plant 1 also comprises a chain conveyor 12 (shown only in part in FIGS. 1 and 2), which extends, in this across a containing plane that is substantially case, vertical and parallel to the directions 4 and 10, and is configured to feed, in succession, the hams 2 from one processing station (not shown) of the hams 2 to a transfer station 13 of the hams 2.

The conveyor 12 is provided with a plurality of support hooks 14 uniformly distributed along the conveyor 12 with a distribution pitch P1 that is substantially equal to a distribution pitch P2 of the pins 11 of a cross member 9.

The hooks 14 are mounted alternately on the two sides of the conveyor 12 so that each hook 14 has a concavity opposite the concavity of the two adjacent hooks 14.

The plant 1 also comprises a transfer unit 15 for transferring the hams 2 from the station 13 to the store 3.

The unit 15 comprises an anthropomorphic robot 16 provided with a plurality of jointed arms 17, and a support frame 18 which is mounted at one free end of the arms 17, and supports two straight guides 19 that are parallel to each other.

The unit 15 also comprises a pick-and-place device 20 comprising, in turn, a shelf 21, which extends between, and transversely to, the guides 19, is coupled, so that it slides, to the guides 19, and is provided with a pair of support arms 22 with an elongated shape.

Figure 5:
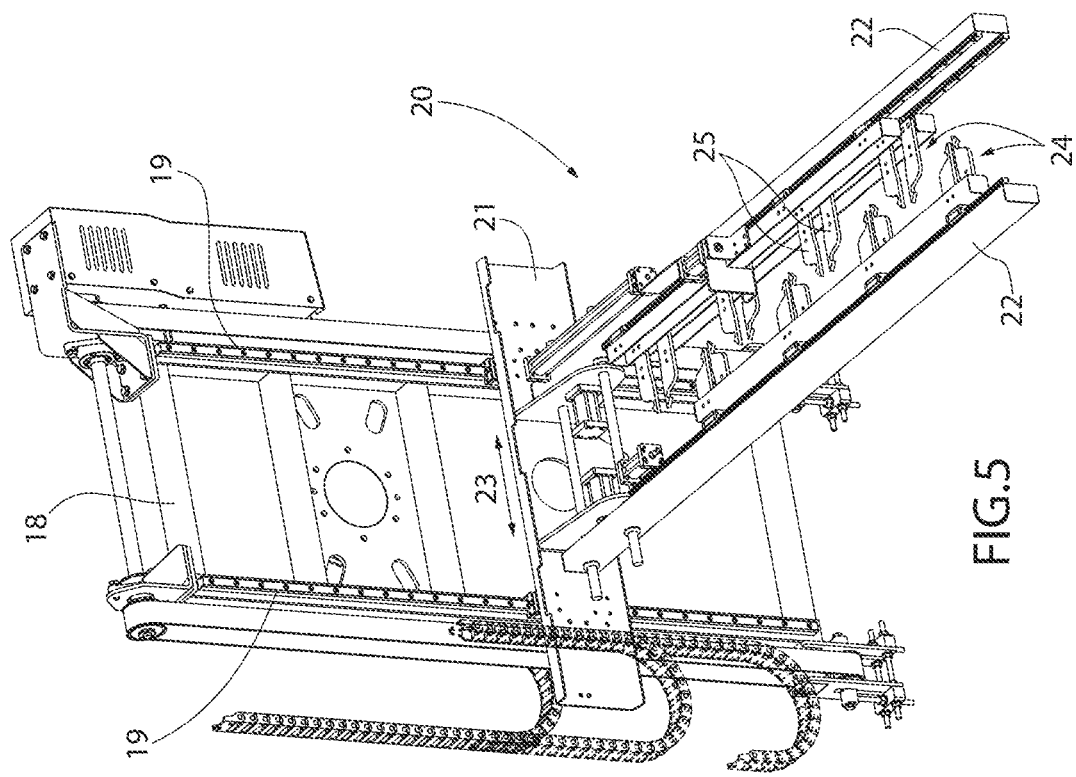

The arms 22 project from the shelf 21 orthogonally to the guides 19 and to the shelf 21, and are coupled to the shelf 21 so that they slide to move one in relation to the other along the shelf 21 itself between an open position (FIGS. 3 and 4) and a closed position (FIG. 5).

Each arm 22 has a length at least equal to the length of a cross member 9.

The device 20 is moved by the robot 16 between a first operating position, wherein the device 20 retrieves the hams 2 from the station 13, and a second operating position, wherein the device 20 releases the hams 2 into the store 3.

At least when the device 20 is arranged in the above-mentioned first and second operating positions, the guides 19 are parallel to the direction 4, the arms 22 extend in the direction 10, and the shelf 21 extends in a direction 23 horizontal and orthogonal to the directions 4 and 10.

Each arm 22 is provided with a plurality of holding members 24, which are equal in number to half of the hooking pins 11 of a cross member 9 (in this case, thus, four members 24), and are uniformly distributed along the arm 22 with a distribution pitch equal to double the distribution pitch of the hooking pins 11 of a cross member 9.

The members 24 of each arm 22 face the other arm 22, and are staggered in relation to the members 24 of the other arm 22, so that the distribution pitch P3 of the members 24 of the two arms 22 is equal to the distribution pitch P2 of the pins 11 of a cross member 9 and to the distribution pitch P1 of the hooks 14 along the conveyor 12.

Each member 24 comprises two jaws 25 that move relative to each other along the corresponding arm 22 between an open position for clamping a ham 2 and a closed position for releasing a ham 2.

The operation of the plant 1 will now be described with reference to FIGS. 1, 2, and 3, imagining the filling of a cross member 9, and starting from a moment in which the device 13 is arranged in its first operating position, the arms 22 are arranged in the open position, and the members 24 are arranged in the closed, release position.

The device 13 is moved forward in the directions 4 and/or 10 so as to move the arms 22 on opposite sides of the hams 2 hooked to the conveyor 12 by means of corresponding hooking rings 26 (FIG. 3) fixed to one end of the hams 2.

Figure 3:
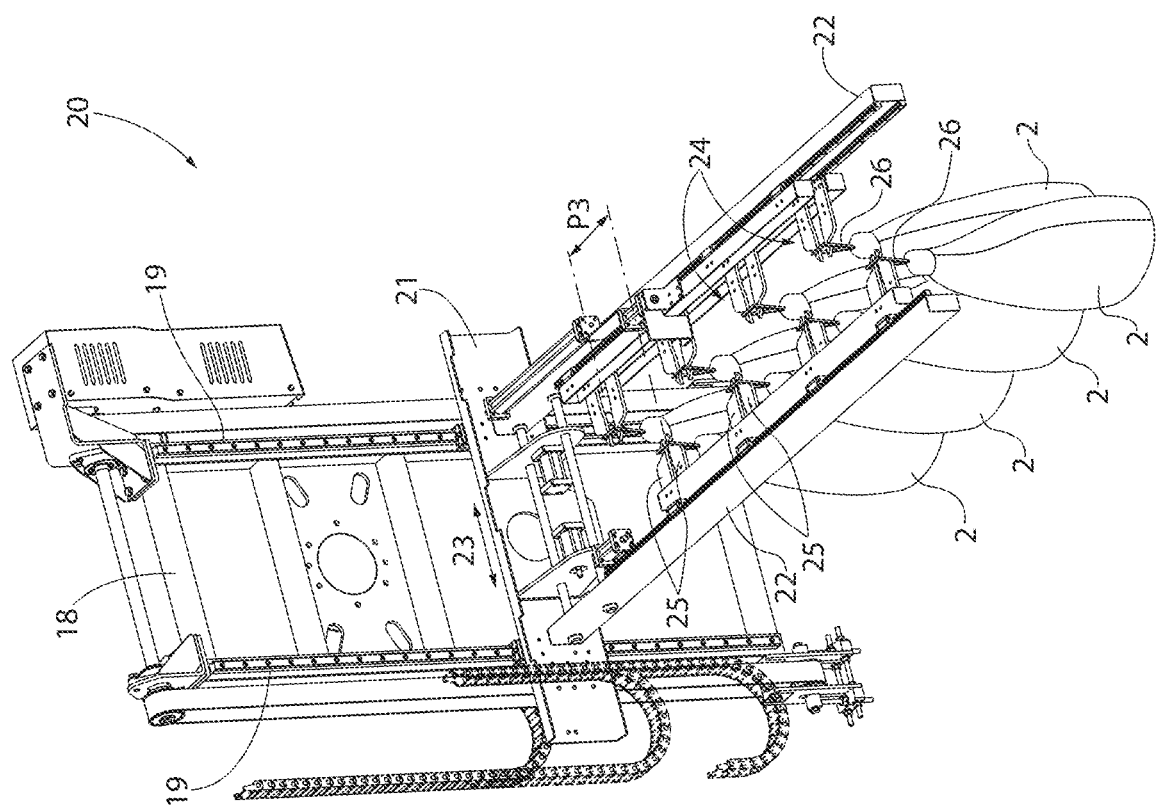
FIGS. 3, 4, and 5 are three schematic perspective views, with parts removed for clarity, of a detail of the plant in FIGS. 1 and 2.
Figure 4:
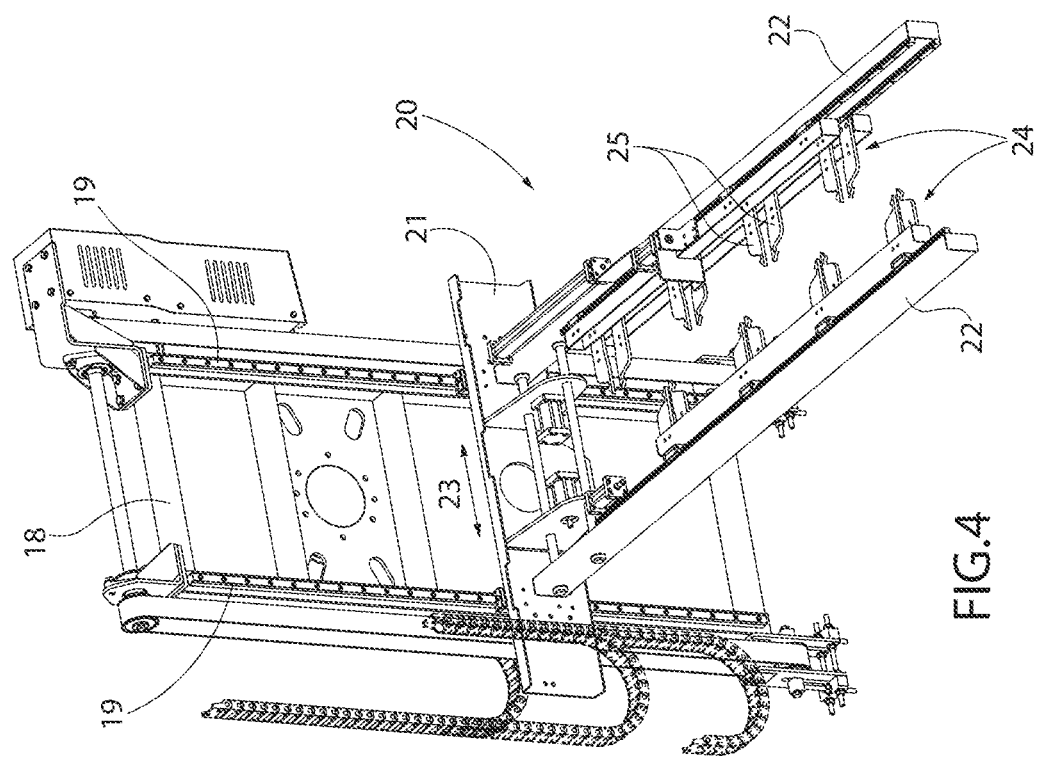

At this point, the arms 22 are moved into their closed position so as to engage the members 24 though the rings 26, the members 24 are moved into their open positions for clamping the hams 2, and the arms 22 are, again, moved into their open position for disengaging two rows of four hams 2 each from the conveyor 12 (FIG. 3).

The device 13 is, thus, moved into its second operating position and moved forward in the directions 4 and/or 10 so as to arrange the arms 22 on opposite sides of a cross member 9, the arms 22 are moved into the closed position for hooking the rings 26 of the hams 2 to the hooking pins 11 of the cross member 9, the members 24 are moved into their closed, release positions, and the arms 22 are, again, moved into the open position to enable the members 24 to disengage the rings 26 of the corresponding hams 2.

The plant 1 has some advantages mainly deriving from the fact that:
each operating cycle of the transfer unit 15 enables the transfer from the station 13 to the store 3 of a number of hams 2 equal to the number of hooking pins 11 of a cross member 9;
the cross members 9 are fixed to the uprights 5 of the store 3 and are not moved; and
filling the store 3 itself is relatively simple and fast.

In addition, since the hams 2 are inserted in the store 3 by the pick-and-place device 20 in the direction 10, i.e., parallel to the cross members 9, the store 3 has relatively reduced dimensions.

According to some variants not shown:
the chain conveyor 12 is eliminated and replaced with a fixed rack to which the hams 2 are hooked;
the holding members 24 may be replaced with different holding members depending on the type of sausages stored in the store 3; and the hooking pins 11 may be replaced with different hooking pins depending on the type of sausages stored in the store 3.

The invention claimed is:

1. A plant for the storage of sausages comprising a loading station for the storage of a succession of sausages; a store, which extends in a first, substantially vertical direction and has a plurality of storage levels, which are arranged on top of one another in the first direction and each comprise at least one respective support cross member, which extends in a second, substantially horizontal direction and is provided with a plurality of first hooking members distributed along the support cross member in the second direction so as to each receive and hold a respective sausage; and a transfer unit to transfer the sausages from the loading station to the store, the transfer unit comprising a pick-and-place device, which is movable between a first operating position, in which the pick-and-place device retrieves the sausages from the loading station, and a second operating position, in which the pick-and-place device releases the sausages onto the support cross member; wherein the pick-and-place device comprises two support arms, which are parallel to one another, have an elongated shape, are provided with respective pluralities of holding members and are movable relative to one another between a closed position and an open position; the sum of the holding members of the two support arms being equal to the number of first hooking members of a support cross member.

2. The plant according to claim 1, wherein, when the pick-and-place device is arranged in its second operating position, the two support arms are parallel to the support cross member and to the second direction.

3. The plant according to claim 1, wherein the loading station comprises a rack, which extends in a substantially vertical containing plane and is provided with a plurality of second hooking members for a succession of sausages; the two support arms being parallel and on opposite sides relative to the containing plane, when the pick-and-place device is arranged in its first operating position.

4. The plant according to claim 3, wherein the rack comprises a ring conveyor, which is movable in the containing plane and is provided with the second hooking members.

5. The plant according to claim 3, wherein the second hooking members are alternatively mounted on the rack so that each second hooking member has a concavity that is contrary to the concavity of the two second hooking members adjacent to it.

6. The plant according to claim 3, wherein the holding members of a support arm are staggered relative to the holding members of the other support arm so that a distribution pitch (P3) of the holding members of the two support arms is the same as a distribution pitch (P1) of the second hooking members of the rack and as a distribution pitch (P2) of the first hooking members of a support cross member.

7. The plant according to claim 1, wherein each holding member comprises two jaws, which are movable relative to one another between a clamping position and a release position to clamp and release a sausage.

8. The plant according to claim 1, wherein the transfer unit comprises an anthropomorphic robot, which is provided with a guide device engaged by the pick-and-place device in a sliding manner; the support arms being movable between their open and closed positions crosswise to the guide device.

9. The plant according to claim 1, wherein each support arm has a length at least equal to a length of the support cross member.

10. The plant according to claim 1, wherein the store comprises a plurality of vertical uprights parallel to the first direction; each support cross member being fixed, in particular welded, to relative vertical uprights.

11. A method for the storage of sausages in a plant comprising a loading station for the storage of a succession of sausages; and a store, which extends in a first, substantially vertical direction and has a plurality of storage levels, which are arranged on top of one another in the first direction and each comprise at least one respective support cross member, which extends in a second, substantially horizontal direction and is provided with a plurality of first hooking members distributed along the support cross member in the second direction so as to each receive and hold a respective sausage, the method comprising the steps of:

simultaneously retrieving two rows of sausages from the loading station, wherein the two rows of sausages are simultaneously retrieved from the loading station and are simultaneously released onto the support cross member a pick-and-place device comprising two support arms, which are parallel to one another, have an elongated shape, are provided with respective pluralities of holding members and are movable relative to one another between a closed position and an open position, wherein the sum of the holding members of the two support arms is equal to the number of first hooking members of a support cross member;

simultaneously transferring the two rows of sausages from the loading station to the store; and simultaneously releasing the two rows of sausages onto the same support cross member.

12. The method according to claim 11, wherein the loading station comprises a rack, which extends in a substantially vertical containing plane and is provided with a plurality of second hooking members for a succession of sausages; each second hooking member having a concavity that is contrary to the concavity of the two second hooking members adjacent to it.

13. The method according to claim 12, wherein the two rows of sausages are retrieved from the loading station by moving the two support arms, arranged in their open position, on opposite sides of the rack, by moving the two support arms to their closed position so as to allow the holding members of each support arm to grab the relative row of sausages and by moving the two support arms again to their open position so as to allow the holding members of each support arm to disengage the relative row of sausages from the second hooking members of the rack.

14. The method according to claim 12, wherein the two rows of sausages are released onto the support cross member by moving the two support arms, arranged in their open position, on opposite sides of the support cross member parallel to the second direction, by moving the two support arms to their closed position so as to allow the holding members of each support arm to hook the relative row of sausages to the first hooking members of the support cross member and by moving the two support arms again to their open position so as to allow the holding members of each support arm to disengage the relative row of sausages.

15. The method according to claim 11, wherein each holding member comprises two jaws, which are movable relative to one another between a clamping position and a release position to clamp and release a sausage.

* * * * *